US010572579B2

(12) United States Patent
Hatsutori

(10) Patent No.: US 10,572,579 B2
(45) Date of Patent: Feb. 25, 2020

(54) ESTIMATION OF DOCUMENT STRUCTURE

(71) Applicant: INTERNATIONAL BUSINESS MACHINES CORPORATION, Armonk, NY (US)

(72) Inventor: Yoichi Hatsutori, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 466 days.

(21) Appl. No.: 14/832,444

(22) Filed: Aug. 21, 2015

(65) Prior Publication Data

US 2017/0052934 A1    Feb. 23, 2017

(51) Int. Cl.
*G06F 17/22*    (2006.01)

(52) U.S. Cl.
CPC .................. *G06F 17/2247* (2013.01)

(58) Field of Classification Search
CPC .................................................. G06F 17/24
See application file for complete search history.

(56) References Cited

U.S. PATENT DOCUMENTS

| | | | | |
|---|---|---|---|---|
| 7,251,777 | B1* | 7/2007 | Valtchev et al. | G06F 17/24 |
| 8,892,992 | B2 | 11/2014 | Mansfield et al. | |
| 2001/0032218 | A1* | 10/2001 | Huang | G06F 17/24 |
| 2005/0050011 | A1* | 3/2005 | Van Der Linden | G06F 17/30595 |
| 2007/0168856 | A1* | 7/2007 | Berkner | G06F 17/30716 715/210 |
| 2011/0119262 | A1* | 5/2011 | Dexter et al. | G06F 17/30 |
| 2011/0302510 | A1* | 12/2011 | Harrison | G06F 17/30899 715/760 |
| 2012/0324341 | A1* | 12/2012 | Dejean | G06F 17/00 |
| 2013/0019164 | A1* | 1/2013 | Whetsell | G06F 17/2745 715/243 |
| 2013/0042172 | A1* | 2/2013 | Mansfield | G06F 17/211 715/234 |
| 2015/0286630 | A1* | 10/2015 | Bateman et al. | G06F 17/2765 |

(Continued)

FOREIGN PATENT DOCUMENTS

| | | |
|---|---|---|
| CN | 102103605 A | 6/2011 |
| CN | 102317933 A | 1/2012 |
| CN | 102375806 A | 3/2012 |

(Continued)

OTHER PUBLICATIONS

Chinese Office Action issued on Application No. 201610692617.3 dated Aug. 29, 2018, 8 pages.

(Continued)

*Primary Examiner* — James J Debrow
(74) *Attorney, Agent, or Firm* — Tutunjian & Bitetto, P.C.; Vazken Alexanian

(57) ABSTRACT

A system and method for estimating document structure of a document which includes extracting one or more candidate elements describing the document structure from the document and grouping the one or more candidate elements into a group and building one or more trees for the group. Each tree has a root node and a leaf node selected from the candidate elements in the group. The method further includes pruning the one or more trees while leaving a path from the root node to the leaf node, based on whether a text corresponding to the path to the leaf node is accommodated in a single group of words.

23 Claims, 16 Drawing Sheets

(56) References Cited

U.S. PATENT DOCUMENTS

2015/0379557 A1* 12/2015 Liu .................... G06Q 30/0244
705/14.43

FOREIGN PATENT DOCUMENTS

| CN | 102486787 A | 6/2012 |
| WO | WO2014005610 A1 | 1/2014 |

OTHER PUBLICATIONS

Chinese Office Action issued on Application No. 201610692617.3 dated May 10, 2019, 22 pages.

* cited by examiner

If any one of the conditions is not satisfied, the options you may choose from are only (i) option 1 and (ii) option 2. However, if all the conditions are satisfied, you can choose any options as follows: (i) promising option 1, (ii) promising option 2 and (iii) promising option 3.

(iii) MAY BE RECOGNIZED AFTER (i) AND (ii)
→ WRONG ANSWER!!

FIG. 1A

If any one of the conditions is not satisfied, the options you may choose from are only (i) option 1 and (ii) option 2. However, if all the conditions are satisfied, you can choose any options as follows: (i) promising option 1, (ii) promising option 2 and (iii) promising option 3.

(i) AND (ii) SHOULD BE RECOGNIZED SEPARATELY FROM (i), (ii) AND (iii)

FIG. 1B

Section 1.

(a) This is first list element in first section.

(b) This is second list element in first section, which includes; 1) first item, 2) second item, and 3) third item.

(c) This is third list element in first section, which includes; 1) first item, or 2) second item.

Section 2.

(a) This is first list element in second section.

(b) This is second list element in second section, which relates to above-mentioned list element (c) etc.

(c) This is third list element in second section.

Section 3.

(a) This is first list element in third section.

(b) This is second list element in third section.

(c) This is third list element in third section.

FIG. 4

EXTRACTION RULE: "Section\s\d+\.\s"
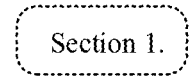
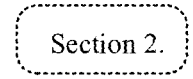
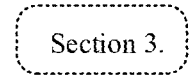
EXTRACTION RULE: "\s([a-z])\s"
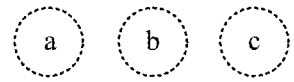
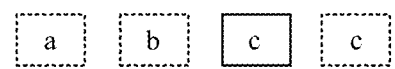
EXTRACTION RULE: "\s\d+)\s"
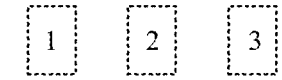
FIG. 5

BUILD TREES FROM CANDIDATE ELEMENTS
EXTRACTED BY RULE "Section\s\d+\.\s" AND
CLASSIFIED WITH "INLINEFEED CODE"
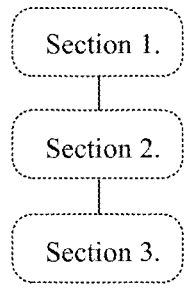
BUILD TREES FROM CANDIDATE ELEMENTS
EXTRACTED BY RULE "\s([a-z])\s" AND CLASSIFIED
WITH "INLINEFEED CODE"
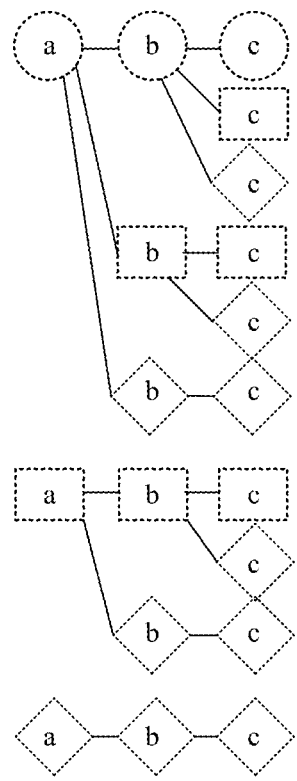
BUILD TREES FROM CANDIDATE ELEMENTS
EXTRACTED BY RULE "\s\d+)\s" AND
CLASSIFIED WITH "PUNCTUATION" OR "ALPHABET"
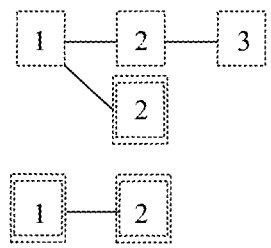
FIG. 7

TREES BUILT FROM CANDIDATE ELEMENTS
EXTRACTED BY RULE "Section\s\d+\.\s" AND
CLASSIFIED WITH "INLINEFEED CODE"

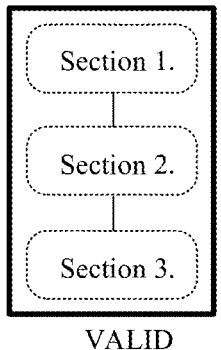
VALID

TREES BUILT FROM CANDIDATE ELEMENTS
EXTRACTED BY RULE "\s([a-z])\s" AND CLASSIFIED
WITH "INLINEFEED CODE"

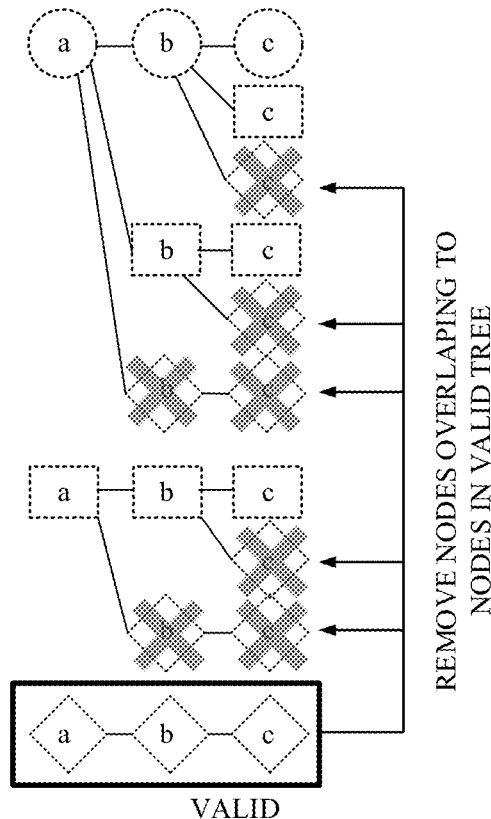
VALID

TREES BUILT FROM CANDIDATE ELEMENTS
EXTRACTED BY RULE "\s\d+)\s" AND
CLASSIFIED WITH "PUNCTUATION" OR "ALPHABET"

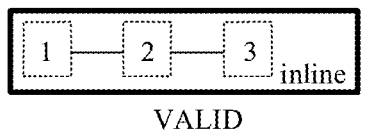
VALID

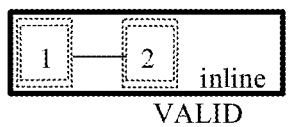
VALID

FIG. 9

This is another sample document.

Section 1.

This is first section.

(a) This is first list element in first section.

(b) This is second list element in first section.

(c) This is third list element in first section.

Section 2.

This is second section.

(c) Is this a list?

BRANCH EXTENDING OVER VALID NODE OF VALID UNBRANCHED TREE

TREES BUILT FROM CANDIDATE ELEMENTS
EXTRACTED BY RULE "Section\s\d+\.\s" AND
CLASSIFIED WITH "INLINEFEED CODE"

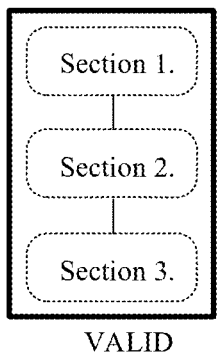
VALID

TREES BUILT FROM CANDIDATE ELEMENTS
EXTRACTED BY RULE "\s([a-z])\s" AND CLASSIFIED
WITH "INLINEFEED CODE"

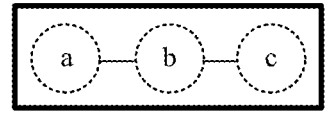
VALID

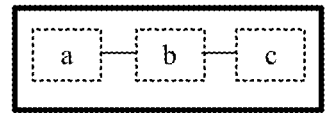
VALID

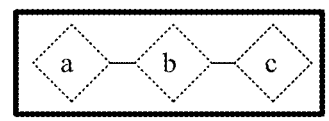
VALID

TREES BUILT FROM CANDIDATE ELEMENTS
EXTRACTED BY RULE "\s\d+)\s" AND
CLASSIFIED WITH "PUNCTUATION" OR "ALPHABET"

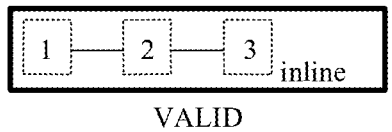
VALID

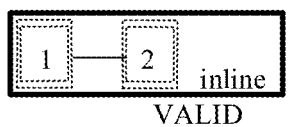
VALID

FIG. 11

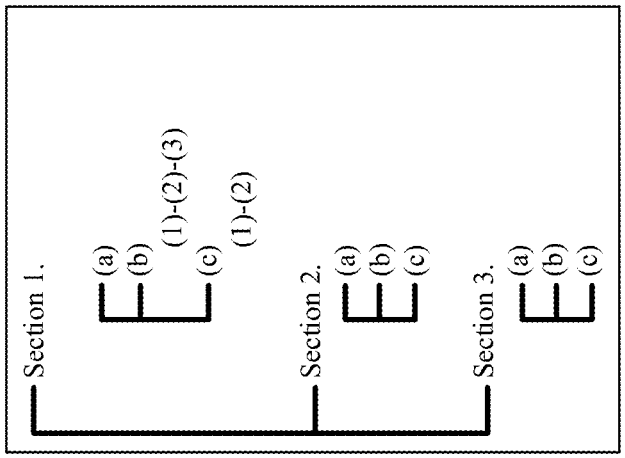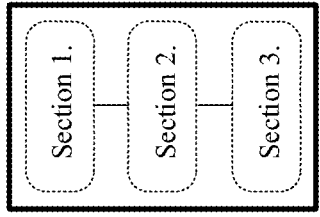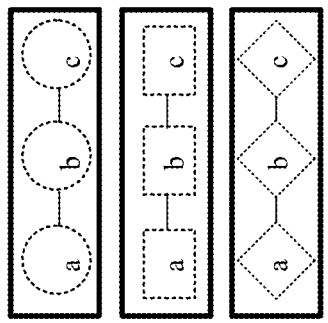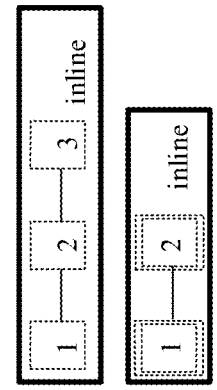
FIG. 12

ESTIMATION OF DOCUMENT STRUCTURE

BACKGROUND

The present invention, generally, relates to document analysis, more particularly, to estimation of document structure.

Identification of document structure including chapters, sections, paragraphs, middle dots, ordered lists, etc. in unstructured documents, is important since a lot of information is stored in unstructured data formats, such as office documents, web contents, etc. For example, in natural language processing (NLP), needless texts, such as numbered references, are required to be removed prior to NLP. In order to develop software that compares provisions between contract documents, for example, ranges of the provisions are required to be identified.

However, unstructured documents do not share any common structural definition, and common information available in the unstructured documents is merely text information. Since the document structure may be varied depending on its objective, author's personality, etc., definitions of the document structure may be different even if the document formats are identical.

In relation to identification of the document structure, international publication WO2014/005610 discloses a multi-level list detection engine. The multi-level list detection engine identifies list elements in a fixed format text based on the presence of a list identifier. The list elements are grouped into lists based on the properties of each list element relative to other list elements. List elements are then assigned to a list level based on the relative properties of the list elements within a list. Finally, level list assignments are verified and corrected, the levels are merged, as necessary, and the lists are consistently formatted as appropriate to create a final well-formed dynamic multi-level list object.

However, conventional techniques for estimating the document structure often make mistakes. For example, an element that does not constitute any lists, such as numbered references, may often be detected incorrectly as a list element. An element that should be recognized separately from a certain in-line list, since that exists in a different sentence from the in-line list, may often be mingled with elements of the in-line list. Conversely, an element that should be recognized together with a certain in-line list, since that exists in a single sentence where the inline list elements exists, may often be omitted.

Accordingly, what is needed are a method, associated computer system and computer program product capable of estimating document structure from a unstructured document based on included text information with good accuracy while preventing mistakes as possible.

SUMMARY

The foregoing problems and shortcomings of the prior art are addressed by the present invention, in which there are provided a method, computer system and computer program product for estimating document structure of a document.

According to an embodiment of the present invention, a method for estimating document structure of a document is provided. The method includes extracting one or more candidate elements describing the document structure from the document. The method further includes grouping the one or more candidate elements into a group and building one or more trees for the group, each of which has a root node and a leaf node selected from the candidate elements in the group. Further the method includes pruning the one or more trees while leaving a path from the root node to the leaf node based on whether a text corresponding to the path to the leaf node is accommodated in a single group of words.

The document structure obtained by the method, according to one embodiment of the present invention, can present improved estimation accuracy. Structure describing elements that exist in a single group of words can be identified correctly. Mistakes such as mingling of a foreign element into elements that exist in different groups of words, and omitting of an element that exists in a single group of words can be prevented.

In an embodiment, according to the present principles, the grouping is performed based on a combination of an extraction rule matched to the candidate element and a classification by an adjacent element adjoin to the candidate element. Therefore, a group of the elements describing a certain partial structure of the document structure can be identified appropriately, thereby preventing incorrect detections and mingling of an element not describing any document structure.

In an embodiment, according to the present principles, the pruning includes identifying an unbranched tree from among the one or more trees as a valid unbranched tree. The pruning further includes removing an inconsistent node overlapping to a node already found in the valid unbranched tree, from a remaining branched tree among the one or more trees. Therefore, the document structure can be efficiently estimated based on available information in the document.

Computer systems and computer program products relating to one or more aspects of the present principles are also described and claimed herein.

Further, according to another embodiment of the present principles, a method for estimating document structure from a document is provided. The method includes extracting one or more candidate elements describing the document structure from the document based on an extraction rule that characterizes an element to be extracted. The method further includes grouping the one or more candidate elements into a group based on a combination of the extraction rule matched to the candidate element and a classification by an adjacent element adjoin to the candidate element. The method further includes building one or more trees for the group, each tree having a root node and a leaf node selected from the candidate elements in the group. Further, the method includes pruning the one or more trees based on a path from the root node to the leaf node for each tree to identify an unbranched tree among the one or more trees.

The document structure obtained by the method according to one embodiment of the present invention can present improved estimation accuracy. A group of the elements describing a certain partial structure of the document structure can be identified correctly, thereby preventing incorrect detection and mingling of an element not describing any document structure.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The forgoing and other features and advantages of the invention are apparent from the following detailed description taken in conjunction with the accompanying drawings in which:

FIG. 1A shows an example of a mistake that may occur during document structure estimation processing;

FIG. 1B shows an example of a correct answer that may occur during document structure estimation processing;

FIG. 4 shows an example of a text document with indications of candidate elements for the process according to second embodiment of the present invention;

FIG. 5 depicts one or more candidate elements extracted from the text document shown in FIG. 4 by the process according to the second embodiment of the present invention;

FIG. 7 depicts one or more element trees built for each group based on a combination of an extraction rule and a classification by a preceding character;

FIG. 9 shows identified valid unbranched trees among the trees shown in FIG. 7 and describes pruning of inconsistent assignments by comparing elements between a target tree and valid unbranched trees;

FIG. 11 shows a result of pruning by iterating blocks S106 to S109 shown in FIG. 3 for the text document shown in FIG. 4;

FIG. 12 shows a result of document structure estimated by the process according to the second embodiment of the present invention;

DETAILED DESCRIPTION OF THE EMBODIMENTS

Figure 2:
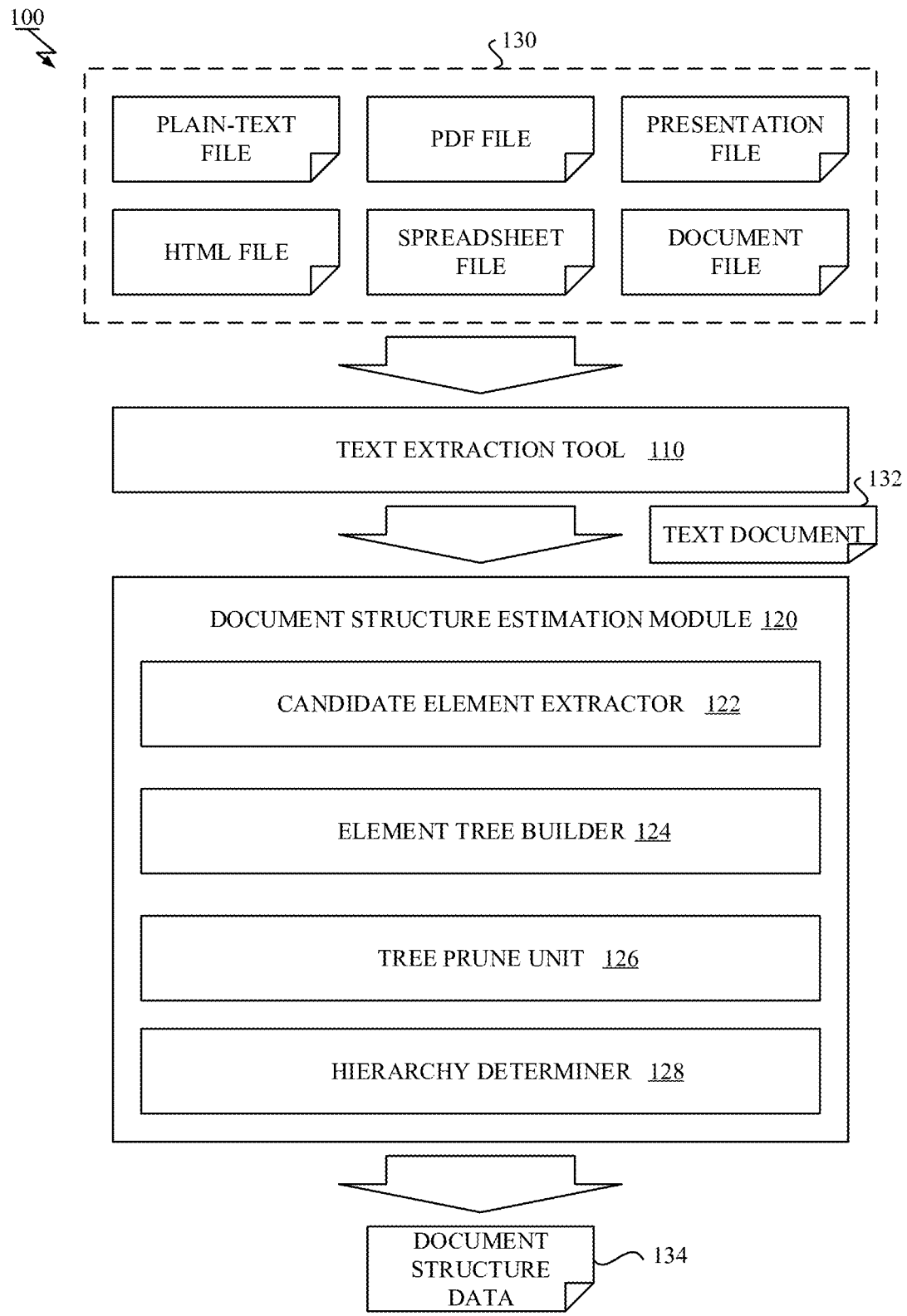
FIG. 2 illustrates a block diagram of a document analysis system according to first embodiment of the present invention.

The present principles will be described using particular embodiments, and the embodiments described hereafter are understood to be only referred as examples and are not intended to limit the scope of the present invention.

One or more embodiments according to the present principles are directed to a method and computer system for estimating document structure of a document. To estimate the document structure of the document correctly, elements describing the document structure and assignments of the elements may be required to be identified based on text information, which is common information available merely in the unstructured documents, while preventing mistakes if possible.

FIG. 1 shows an example of a mistake that may occur during the document structure estimation processing. During the estimation processing, a foreign element that should be recognized separately from a certain in-line list, since that exists in a different sentence from the in-line list, may be mingled with elements of the in-line list. Conversely, an element that should be recognized together with a certain in-line list, since that exists in a single sentence where the in-line list elements exists, may be omitted.

In FIGS. 1A and 1B, a sample text including two series of ordered lists with lower-case roman numeral sequences, each of which exists in different sentence order from each other, is illustrated. FIG. 1A shows an incorrectly estimated example, whereas FIG. 1B shows a correct answer for the sample text. As shown in FIG. 1B, the list elements of "(i)" and "(ii)" surrounded by the circles should be recognized separately from the list elements of "(i)", "(ii)" and "(iii)" surrounded by the squares because the elements surrounded by the circles and the elements surrounded by the squares constitute different in-line lists, respectively.

However, as shown in FIG. 1A, the list element of "(iii)" surrounded by the square may be recognized posterior to the elements of "(i)" and "(ii)" surrounded by the circles, constituting a series of an ordered list that includes the elements of "(i)" and "(ii)" surrounded by the circles and the element of "(iii)" surrounded by the square. In this case, the elements of "(i)" and "(ii)" in the second sentence may be omitted, resulting in further mistakes.

Therefore, a method and associative computer system configured to estimate document structure from the unstructured document based on the text information with good accuracy while preventing mistakes if possible is needed.

In one or more embodiments according to the present principles, one or more candidate elements describing the document structure are extracted from the text document, preferably using an extraction rule that characterizes elements to be extracted. Then, the extracted candidate elements are grouped into one or more groups, preferably based on a combination of the extraction rule matched to each candidate element and a classification by an adjacent element adjoined to each candidate element. Then, one or more trees are built for the group. Each tree may have a root node, one or more internal nodes, and one or more leaf nodes selected from the candidate elements in the group. Each tree represents one or more potential partial structures of the document structure. Then, the one or more trees are pruned so as to identify an unbranched tree that represents a plausible partial structure of the document structure, while leaving a path from the root node to the leaf node based on whether a text corresponding to the path to the leaf node is accommodated in a single group of words, which is typically single sentence.

Since the one or more trees built from the candidate elements in the group are pruned by considering whether the text corresponding to the path to the leaf node is accommodated in the single group of words, structure describing elements that exist in the single group of words can be identified correctly and mistakes, such as mingling of a foreign element into elements that exist in different sentences and omitting of an element that exists in a single sentence, can be prevented thereby improving estimation accuracy.

In one embodiment, a group of the elements describing a certain partial structure of the document structure can be identified appropriately, thereby preventing incorrect detection and mingling of an element not describing any document structure.

Now referring to FIG. 2, a computer system for estimating document structure according to one embodiment of the present principles is illustratively depicted.

FIG. 2 illustrates a block diagram of the document analysis system (corresponding to the computer system) according to one embodiment of the present principles. As shown in FIG. 2, the document analysis system 100 includes a text extraction tool 110 configured to extract text information from the unstructured document file 130 and generate the text document 132, and a document structure estimation module 120 that is configured to estimate logical document structure from the text document 132 extracted by the text extraction tool 110 and output the document structure data 134.

The text extraction tool 110 may include any known text extraction program modules corresponding to any available file formats. The file formats of the unstructured document file 130 may include, but is not limited to, a plain-text file, Portable Document Format (PDF) file, presentation file (open formats such as OpenDocument Format and Office Open XML (eXtensible Markup Language) or other proprietary formats), HyperText Markup Language (HTML) file, spreadsheet file (open formats or other proprietary formats), word processor document file (open formats or other proprietary formats), etc. The text extraction tool 110 may generate the text document 132 in XML format, for instance, and paragraph boundaries may be provided, if available.

The document structure estimation module 120 performs a method for estimating the document structure according to one or more embodiments of the present invention. The document structure estimation module 120 may include a candidate element extractor 122 configured to extract one or more candidate elements from the text document 132 and an element tree builder 124 configured to build exhaustively one or more possible element trees from the extracted candidate elements. The document structure estimation module 120 further includes a tree prune unit 126 configured to prune unlikely branches of the trees so as to identify trees representing plausible partial structures and a hierarchy determiner 128 configured to determine hierarchies between identified trees so as to construct the logical document structure including all plausible partial structures (e.g., chapters, sections, subsections, sub-subsections, ordered lists, unordered lists, etc.) represented by the identified trees and relationships between the partial structures.

In one embodiment, the candidate element extractor 122 may extract one or more candidate elements from the text document 132 by using an extraction rule that includes an expression characterizing elements to be extracted. The expression may be, but is not limited to, a regular expression (e.g., "\s\d+)\s", "\s[a-z])\s", etc.) or a pattern that matches to certain text portions. Each candidate element may be an element describing the logical document structure of the text document 132 (and the unstructured document 130) and may be any one of a chapter heading, section heading, subsection heading, sub-subsection heading, item of ordered list, item of unordered list, etc.

In one embodiment, the element tree builder 124 groups the one or more candidate elements extracted by the candidate element extractor 122 into one or more groups based on a combination of the extraction rule matched to each candidate element and a classification by an adjacent element preceding to each candidate element. In English or Japanese horizontal writing documents, the adjacent element is a left hand-side character. In Japanese vertical writing documents, the adjacent element is an upper character. In Arabic language documents, the adjacent element is a right hand-side character. The adjacent element is classified into one or more classifications that include "alphabet", "punctuation" and "linefeed code" in the particular embodiment.

Then, the element tree builder 124 builds one or more element trees for each group, exhaustively. Each element tree has plurality of nodes including a root node and one or more leaf nodes selected from the elements in the group. Each tree accommodates one or more combinations of elements successively picked up from the candidate elements of the group in a reading direction. Each combination represented by the path from the root node to each leaf node corresponds to each potential partial structure in the document structure.

Each root node may be one of the earliest ordered objects among the candidate elements in the group (e.g., each "(a)" is selected as each root node from among a group of "(a)", "(b)", "(c)", "(a)", "(b)" and "(c)"), or one of the first appeared objects among the candidate elements in the group (e.g., first appeared middle dot is selected as the root node from among a group of several middle dots). The ordered objects includes incrementally changing values or symbols and may be alphabetic sequences ("a", "b", "c", ..., or "A", "B", "C", ... ), roman numeral sequences ("I", "II", "III", ... or "i", "ii", "iii", ... ), Arabic numeral sequences ("1", "2", "3", ... ), iroha sequences, etc. The unordered object includes a middle dot, circles, squares, diamonds, etc. Left and/or right parentheses or brackets may be appended with the ordered object and the unordered object, which includes a round bracket (e.g., "a)" or "(a)"), square bracket (e.g., "a]" or "[a]"), angle bracket (e.g., "a>" or "<a>"), etc.

The tree prune unit 126 prunes the one or more element trees based on the path from the root node to the leaf node to identify an unbranched tree among the one or more element trees. As described above, each tree accommodates one or more combinations and each combination represented by the path from the root node to the leaf node corresponds to each potential partial structure in the document structure. Hence, the objective of pruning is to identify the most plausible partial structure from among the potential partial structures for each tree.

In one embodiment, the tree prune unit 126 performs pruning of the one or more element trees while leaving a path from the root node to the leaf node in response to determining that the text corresponding to the path to the leaf node is accommodated in a single sentence. Determination may be done by checking a proposition whether the text from the root node to the leaf node exists in a single sentence by using any known sentence splitter.

The hierarchy determiner 128 identifies super-sub relationships between the identified unbranched trees based on positions of the unbranched trees. The position may include start and/or end character positions of the elements of the trees, paragraph numbers where the element exists, etc. As described above, since each unbranched tree represents each plausible partial structure in the document structure, the hierarchy determiner 128 can identify hierarchies between the partial structures that is identified by the tree prune unit 126 from the trees exhaustively built by the element tree builder 124, and output estimated document structure that includes the all partial structures and relationships between the partial structures, as the document structure data 134.

In one embodiment, each of the units described in FIG. 2 may be implemented on a computer device, where program codes according to one or more embodiments of the present invention are loaded on a memory and executed by a processor.

Figure 3:
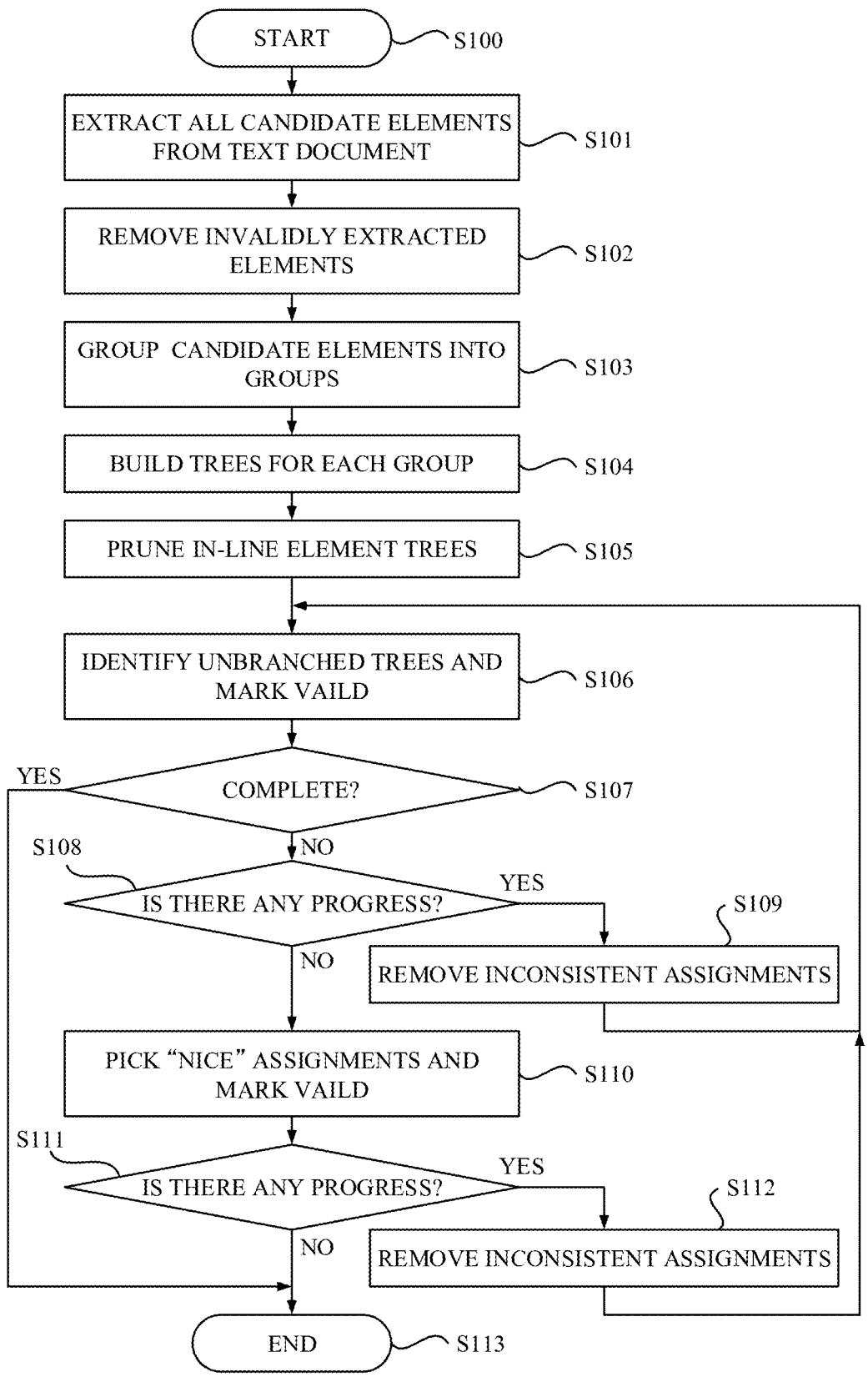
FIG. 3 is a flowchart depicting a process for estimating document structure of an unstructured document according to second embodiment of the present invention.

Now referring to FIG. 3 with series of FIGS. 4-12, a method for estimating document structure according to embodiments of the present invention will be described in detail. FIG. 3 is a flowchart depicting the process (corresponding to the method) for estimating document structure of the unstructured document according to one embodiment of the present invention. FIG. 4 shows an example of the text document 132 for the method according to one embodiment of the present invention.

As shown in FIG. 3, the method begins at block S100 in response to receiving an execution command of the document structure estimation processing with an input text document. Note that the method shown in FIG. 3 may be performed by the document structure estimation module 120 depicted in FIG. 2 for the given input text document, which is shown in FIG. 4 by way of example.

At block S101, the document structure estimation module 120 extracts all potential candidate elements from the text document 132 by the candidate element extractor 122. The candidate element extractor 122 extracts one or more candidate elements describing the document structure from the text document 132 by using one or more extraction rules, each of which includes an expression characterizing elements to be extracted.

In FIG. 4, the candidate elements extracted from the text document 132 are also indicated by the dashed squares with rounded corners, the dashed circles, the dashed squares, the dashed double squares, the solid squares, and the dashed diamonds. FIG. 5 depicts one or more candidate elements extracted from the text document shown in FIG. 4 by the method according to one embodiment of the present invention and summarizes for each extraction rule.

In FIG. 4 and FIG. 5, the elements of "section 1.", "section 2." and "section 3." surrounded by the dashed squares with the rounded corners are extracted by using the extraction rule #1 of "Section\s\d+\. \s". The elements of "(a)", "(b)" and "(c)" surrounded by the dashed circles, the elements of "(a)", "(b)" and "(c)" surrounded by the dashed squares, the element of "(c)" surrounded by the solid square and the elements of "(a)", "(b)" and "(c)" surrounded by the dashed diamonds are extracted by using the extraction rule #2 of "\s([a-z])\s". The elements of "1)", "2)" and "3)" surrounded by the dashed squares and the elements of "1)" and "2)" surrounded by the dashed double squares are extracted by using the extraction rule #3 of "\s\d+)\s".

Referring back to FIG. 3, at block S102, the document structure estimation module 120 removes invalidly extracted elements from the extracted candidate elements by the candidate element extractor 122. In an embodiment, the candidate element extractor 122 removes the invalidly extracted element not describing any document structure from the extracted candidate elements by using a rule that defines exceptions.

Figures 6A, 6B:
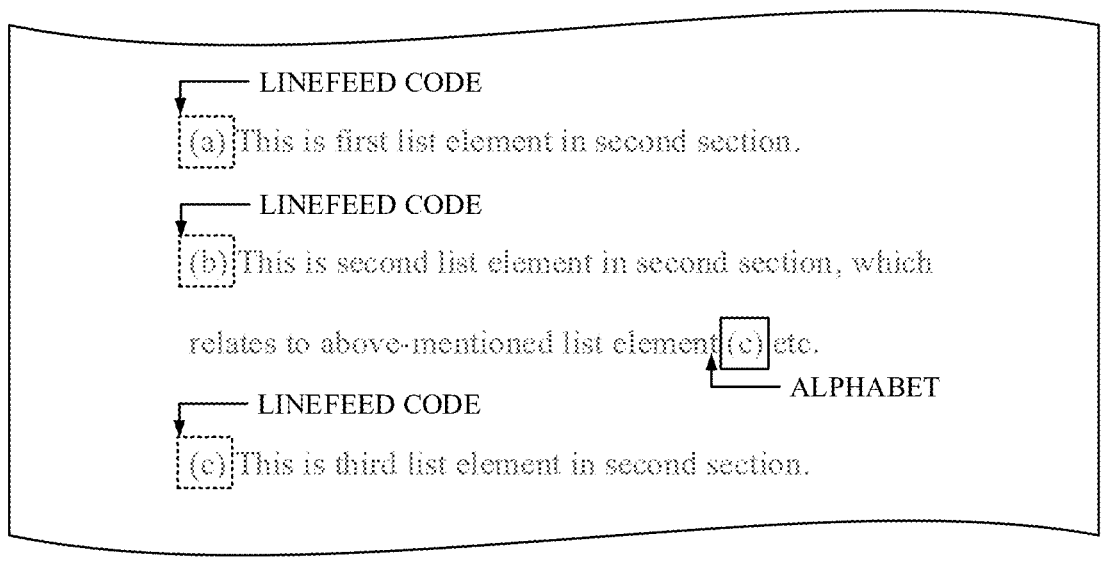
FIG. 6A shows an example of an element invalidly extracted in block S101 shown in FIG. 3.
FIG. 6B describes classification of candidate elements by a preceding character with an enlarged portion of the "section 2" in the text document shown in FIG. 4.

FIG. 6A shows an example of an element invalidly extracted in block S101 shown in FIG. 3. As shown in FIG. 6A, the text portion "_1)_" in the text "- - - -_(Fig._1)_- - - - -" (spaces are replaced with underscores for convenience) may be matched to the extraction rule of "\s\d+)\s". Therefore, the text portion "_1)_" may be extracted as a candidate element in block S101 in FIG. 3. However, such text portion may constitute merely contents of sentences and may not be intended to describe any document structure. Thus, extracted elements corresponding to such text portion can be preferably removed from the candidate elements by using the exception rule such as regular expression of "Fig\.\s\d+)\s".

Referring back to FIG. 3, in block S103, the document structure estimation module 120 groups the one or more candidate elements into one or more groups by the element tree builder 124. The grouping is conducted based on a combination of the extraction rule matched to each candidate element and the classification by the adjacent element to each candidate element. In block S104, the document structure estimation module 120 builds one or more trees for each group by the element tree builder 124. The building of the trees is conducted by considering the positions of the candidate elements and reading direction.

For example, each candidate element may be classified by the preceding character of each candidate element into one or more classifications that includes "alphabet", "punctuation", "linefeed code", etc. Then, the candidate elements extracted by the extraction rule of "\s\d+)\s" and classified with "linefeed code" are grouped into a group where one or more trees may be built from, for example. The candidate elements extracted by the extraction rule of "\s\d+)\s" and classified with "linefeed code" or "punctuation" are grouped into a group where trees may be built from, for example. In another example, the candidate elements extracted by the extraction rule of "\s\d+)\s" or "\s[a-z])\s" and classified with "linefeed code" are grouped and trees may be built from the group.

FIG. 6B describes the classifications of the candidate elements by each preceding character with the enlarged portion of the "section 2" in the text document shown in FIG. 4. As shown in FIG. 6B, both sequences of the dashed elements "(a)", "(b)" and "(c)" and the dashed elements "(a)" and "(b)" and the solid element "(c)" make sense since the elements in both sequences appear sequentially along with the reading direction in incremental manner. Thus, a question arises as to which of the two sequences is correct.

In one embodiment, since the extracted candidate elements are grouped based on the combination of the extraction rule and the classification by the preceding character, the sequence of the dashed elements "(a)", "(b)" and "(c)" that has the preceding characters classified with "linefeed code" can be grouped separately from the solid element "(c)" having a preceding character classified with "alphabet".

FIG. 7 depicts the one or more element trees built for each group based on the combination of the extraction rule and the classification by the preceding character. As shown in FIG. 7, one tree is built from the candidate elements in the group extracted by the extraction rule #1 and classified with "linefeed code". Also, three trees are built from the candidate elements in the group extracted by the extraction rule #2 and classified with "linefeed code", each of which starts from earliest ordered object "a". Two trees are built from the candidate elements in the group extracted by the extraction rule #3 and classified with "punctuation" or "alphabet", each of which starts from earliest ordered object "1". Note that the element "(c)" surrounded by the solid square shown in FIG. 4 and FIG. 6B does not constitute any trees in FIG. 7.

Each tree has a plurality of the nodes including the root node, the one or more leaf nodes, and optionally one or more internal nodes selected from the candidate elements in corresponding group. Each tree accommodates one or more combinations of the candidate elements that appear in the reading direction. Thus, the element of "c" surrounded by the circle does not follow the succeeding elements of "a" and "b" surrounded by the squares. For ordered object, each tree accommodates one or more combinations of the candidate elements in incremental manner. Thus, the element of "a" surrounded by the square does not follow the later elements of "b" and "c" surrounded by the circles even if the element of "a" appears posterior to the elements of "b" and "c". Each combination represented by the path from the root node to each leaf node corresponds to each possible partial structure in the text document.

Referring back to FIG. 3, in block S105, the document structure estimation module 120 prunes in-line element trees, by the tree prune unit 126, while leaving the path from the root node to the leaf node based on whether the text corresponding to the path to the leaf node is accommodated in a single sentence.

Figure 8:
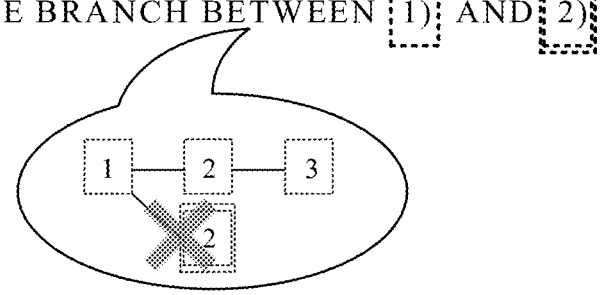
FIG. 8 describes pruning of an inline element tree with an enlarged portion of the "section 1" in the text document shown in FIG. 4.

FIG. 8 describes the pruning of the inline element tree with the enlarged portion of the "section 1" in the text document shown in FIG. 4. As shown in FIG. 8, determination is done by checking a proposition whether the text from the root node to the leaf node exists in a single sentence by using an appropriate sentence splitter. If the proposition is true for the targeted leaf node, the tree prune unit 126 leaves the path from the root node to the targeted leaf node, and prunes all remaining branches other than the path in the tree. If the proposition is false, the tree prune unit 126 checks the next leaf.

In FIG. 8, the text from the elements "1" to "3" surrounded by the single squares is accommodated in a single sentence. On the other hand, the text from the element of "1" surrounded by the single square to the element of "2" surrounded by the double square is split and spread over multiple sentences. Thus, the branch between the element of "1" surrounded by the single square and the element of "2" surrounded by the double square are removed by the pruning procedure according to one embodiment of the present invention.

There are mainly two types of document structure. One is in-line type where elements are accommodated in single sentence. Another is block level type where elements are spread over multiple sentences. In one embodiment, identification of the inline type elements is conducted prior to the block level type elements.

Referring back to FIG. 3, in blocks from S106 to S112, the tree prune unit 126 prunes trees iteratively by using any combination of clues that may include the extraction rule used in extraction, the classification based on preceding character, the result of block S105, the trees already identified as valid, and the positions of elements.

In block S106, the tree prune unit 126 identifies the unbranched trees from among remaining trees and marks the identified unbranched tree as valid, by the tree prune unit 126. FIG. 9 shows the identified valid unbranched trees among the trees shown in FIG. 7. In FIG. 9, four unbranched trees are shown. Here, the unbranched trees may include an unbranched tree of inline elements accommodated in a single sentence and/or an unbranched tree of block level elements spreading over multiple sentences.

In block S107, the document structure estimation module 120 determines whether the estimation is completed. If the estimation is not completed, since there remains at least one unidentified trees, the process proceeds to block S108. In block S108, the document structure estimation module 120 further determines whether there is any progress at all. In response to determining that there is some progress at S108, the process proceeds to block S109.

In block S109, the document structure estimation module 120 removes inconsistent assignments by the tree prune unit 126 and the process loops back to block S106. In block S109, the tree prune unit 126 compares elements in the target tree and the valid unbranched tree, and removes any inconsistent nodes overlapping a node already found in the valid unbranched tree from remaining branched trees.

FIG. 9 also describes the pruning of the inconsistent assignments by comparing the elements between the target tree and the valid unbranched trees. In FIG. 9, since the tree that includes the elements of "a", "b" and "c" surrounded by dashed diamonds has been identified as valid, nodes overlapping to the elements of "b" and "c" surrounded by dashed diamonds are removed as inconsistent nodes from remaining trees.

Figures 10A, 10B:
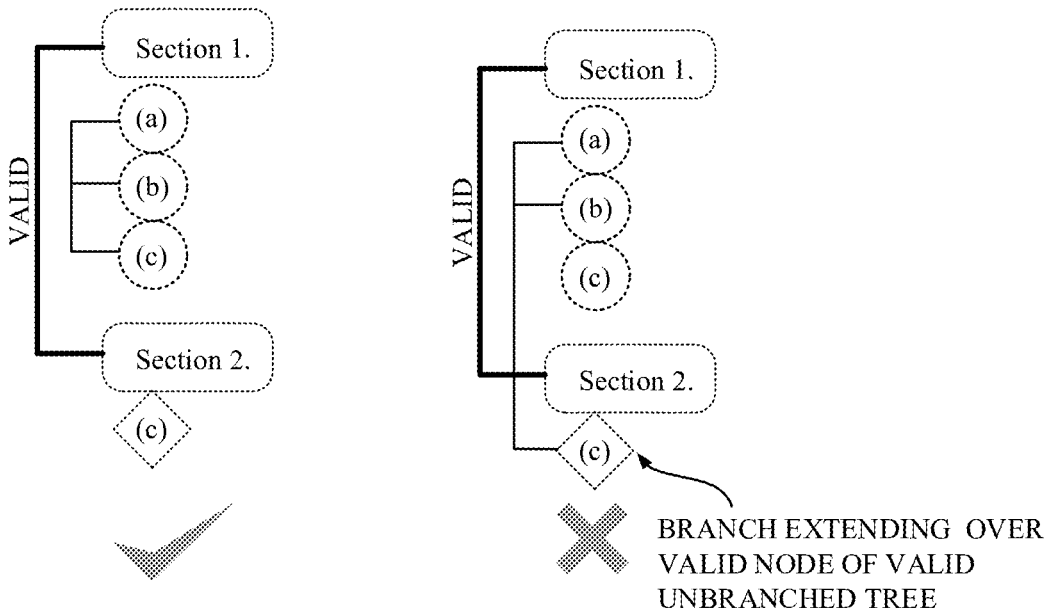
FIG. 10A shows other sample of an input text document.
FIG. 10B shows other way of pruning inconsistent assignments based on positions of branches and valid nodes.

FIG. 10A shows the other sample of the input text document and FIG. 10B shows another embodiment of pruning the inconsistent assignments based on the positions of the branches and the valid nodes. As shown in FIG. 10, assuming that the tree of "section 1." and "section 2." has been identified as valid, the tree that includes a branch extending over the valid "section 2." may be doubtful because partial structures seldom cross over their super partial structure. So, in one embodiment, the tree prune unit 126 may prune out an inconsistent branch extending over a valid node already found in the valid unbranched tree based on positions of the branches and the valid nodes.

During the pruning of the inconsistent assignments, a higher priority is assigned to trees which have candidate elements accompanying a prefix (e.g., "Chapter", "Section", etc.) and/or a preceding linefeed code than other trees without the prefix or the preceding linefeed code so that the trees assigned by the higher priority are checked prior to the other trees. For example, in the FIG. 10B, the tree of "section 1." and "section 2." are checked so as to be identified as valid prior to the tree of "a", "b" and "c".

FIG. 11 shows the result of the pruning tree by iterating blocks S106 to S109 shown in FIG. 3 for the text document shown in FIG. 4. As shown in FIG. 11, all trees are pruned into unbranched trees and all unbranched trees are marked as valid. In this case, in block S107, the document structure estimation module 120 determines that the estimation is completed since there remains no unidentified tree among the trees any more. In response to determining that the estimation is completed, the process proceeds to block S113. Then, the process ends at S113.

Now referring back to block S108, in response to determining that there is no progress since there exists a remaining tree not identified as valid, even after the identifying of the unbranched tree and the removing of the inconsistent node are conducted iteratively, the process proceeds to block S110 for further estimation.

In block S110, the document structure estimation module 120 tries to pick a "nice" assignment and marks the nice assignment as valid. In the particular embodiment, the tree prune unit 126 may identify a chain to be regarded as valid (e.g., a valid tree) based on a heuristics rule where one of the longest chains is recognized as a valid chain, for example.

In block S111, the document structure estimation module 120 determines whether there is any progress at all. In response to determining that there is some progress at S112, the process proceeds to block S112. In block S112, the document structure estimation module 120 removes inconsistent assignments by the tree prune unit 126 and the process loops back to block S106. In response to determining that there is no progress at S111, since there exists at least one remaining unidentified tree even after the identifying of the unbranched tree, the identifying of the nice assignment and the removing of the inconsistent node are conducted iteratively, the process proceeds to block S113 to end the process.

After the process shown in FIG. 3 is completed, the hierarchy determiner 128 determines a hierarchy between the identified valid branched trees based on positions of the valid unbranched trees.

FIG. 12 shows the result of the document structure estimated by the process according to one embodiment of the present invention for the text document shown in FIG. 4. In FIG. 12, the input text document and the identified valid element trees are depicted. FIG. 12 also depicts the estimated document structure resulting from the input text document. As shown in FIG. 12, the hierarchy determiner 128 determines hierarchies between the unbranched trees identified by the method shown in FIG. 3 so as to construct the whole document structure. The estimated document structure includes all plausible partial structures represented by the identified unbranched trees and the sub-super relationships between the partial structures based on positions of the unbranched trees, as shown in FIG. 12.

Figure 13:
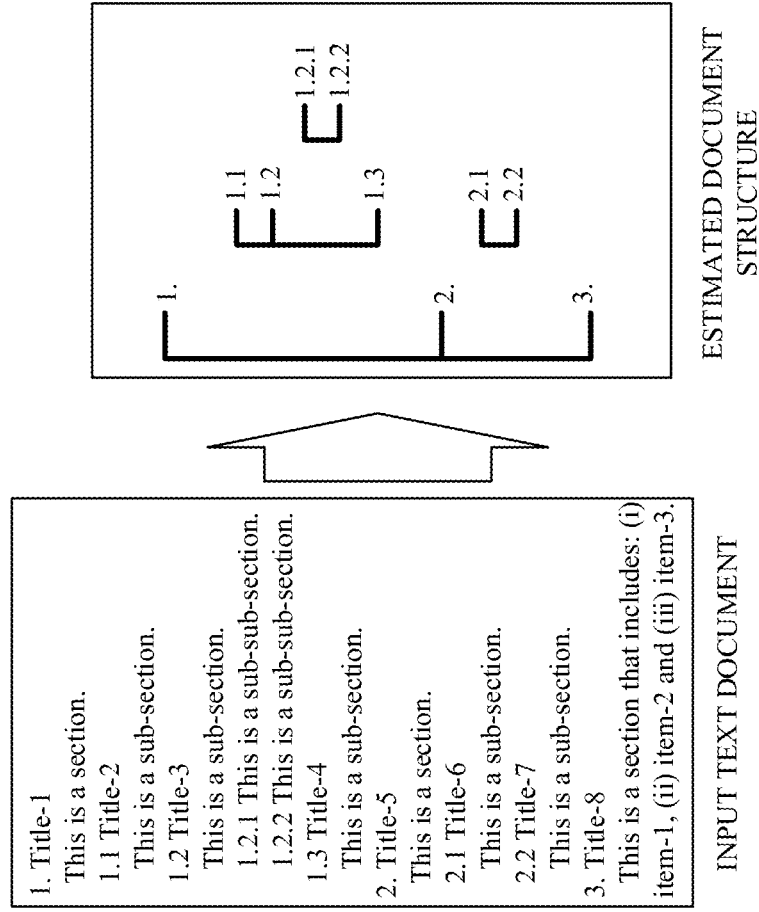
FIG. 13 shows one example of use cases of document structure estimation processing according to one or more embodiment of the present invention.

FIG. 13 shows one example of the document structure estimation processing according to the one or more embodiments of the present invention. As shown in FIG. 13, an advanced text extraction tool incorporating the novel document structure estimation processing can extract titles and texts with the document structure including section, subsection and sub-subsection.

The document structure obtained by the method according to the one or more embodiments of the present invention can present improved estimation accuracy. Structure describing elements that exist in a sentence can be identified correctly. Mistakes, such as mingling of a foreign element into elements that exist in different sentences and omitting of an element that exists in a single sentence, can be prevented. Therefore, structured text information extracted from the input text document can also present improved estimation accuracy.

Cloud Environment Implementation

Hereinafter, there is shown a cloud computing environment for estimating document structure according to third embodiment of the present invention. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 14:
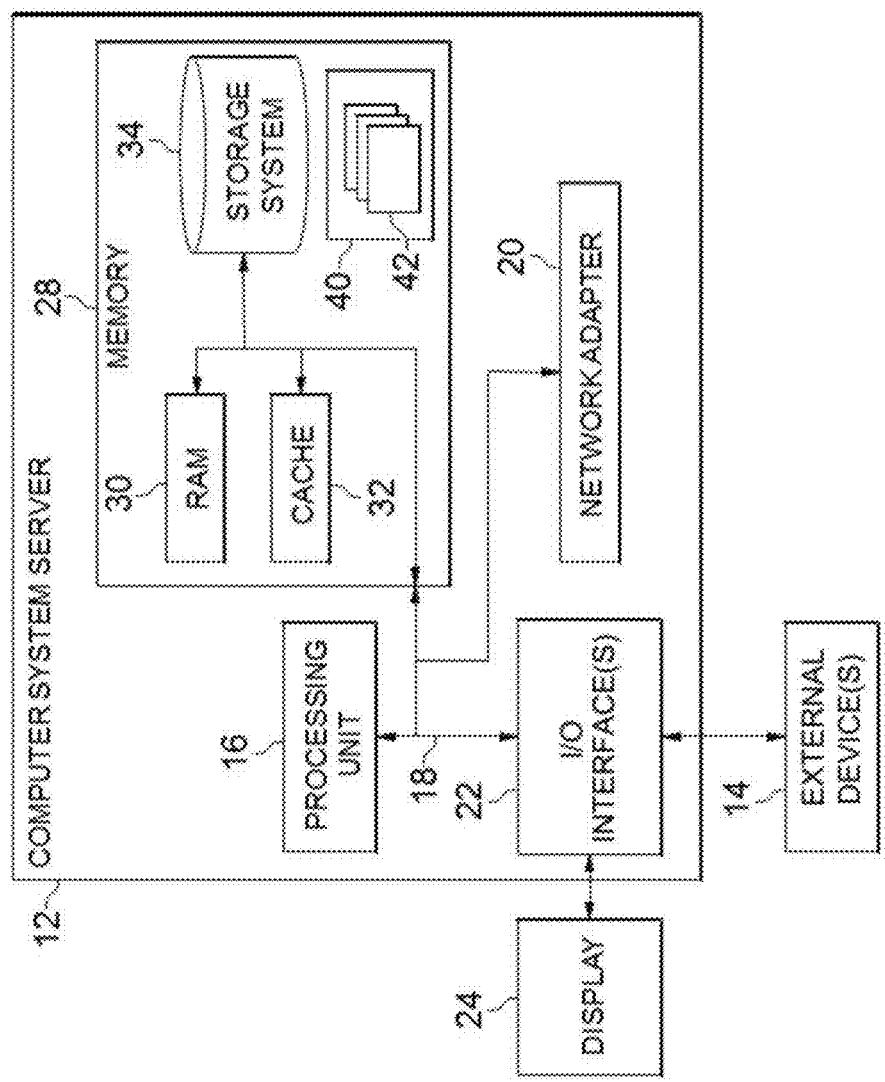
FIG. 14 depicts a cloud computing node according to an embodiment of the present invention.

Referring now to FIG. 14, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, a computer system/server 12 is provided, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 15:
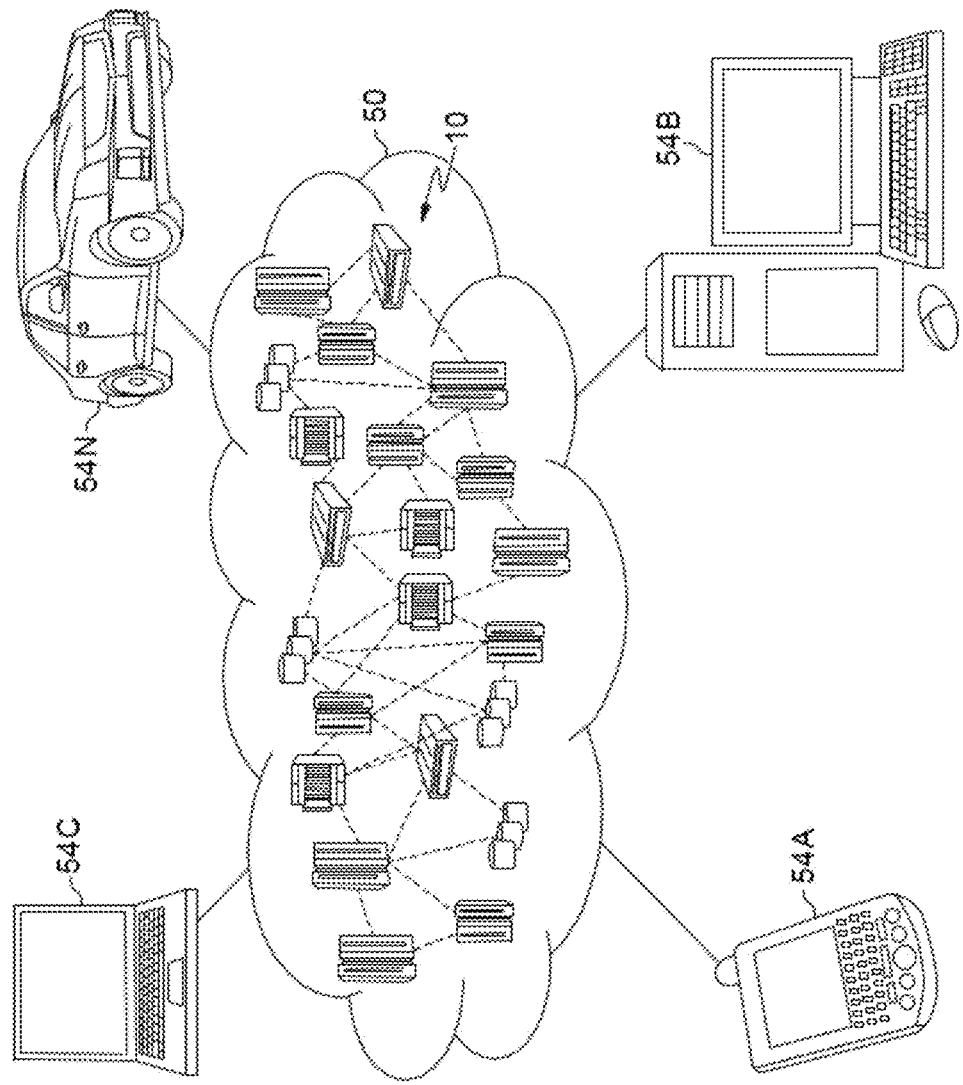
FIG. 15 depicts a cloud computing environment according to an embodiment of the present invention.

Referring now to FIG. 15, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 15 are intended to be illustrative only and that computing nodes 10 and cloud computing environment 50 can communicate with any type of computerized device over any type of network and/or network addressable connection (e.g., using a web browser).

Figure 16:
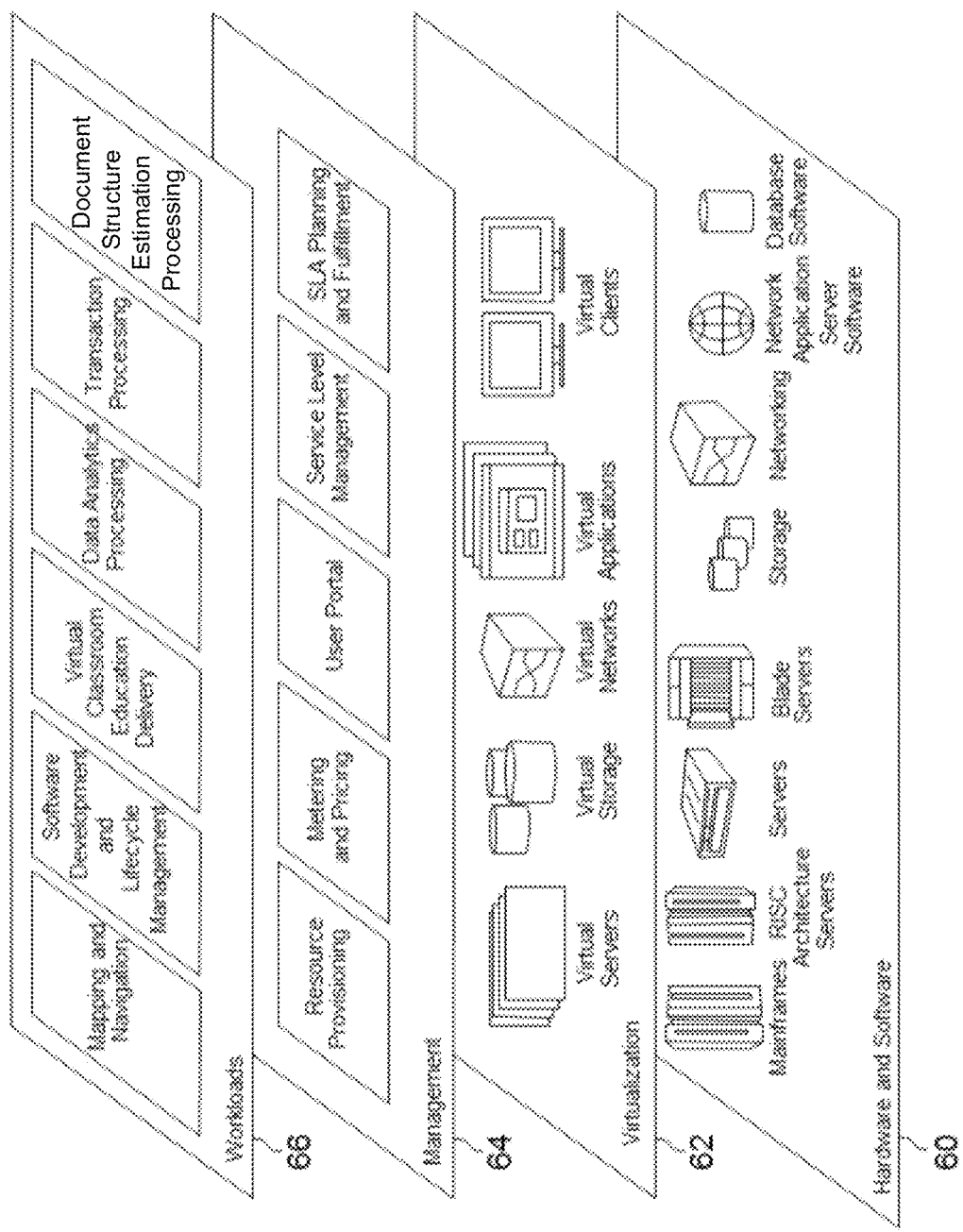
FIG. 16 depicts abstraction model layers according to an embodiment of the present invention.

Referring now to FIG. 16, a set of functional abstraction layers provided by cloud computing environment 50 (FIG.

15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and document structure estimation processing.

In a particular embodiments, there is provided a computer program product or software that implements the document structure estimation processing in accordance with embodiments described herein, as a service in a cloud environment. In a particular embodiment, at least one of the above-mentioned steps including extracting of the candidate elements, building of the trees, pruning of the trees, and determining of the document structure may be performed in the cloud computing environment.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for estimating document structure of an unstructured document, comprising:
   extracting one or more candidate elements describing a logical document structure from an unstructured document;
   grouping the one or more candidate elements into a group;
   building one or more trees, representing the logical document structure of the unstructured document, for the group, each tree having a root node and a leaf node selected from the candidate elements in the group; and
   pruning the one or more trees while leaving a path from the root node to the leaf node to identify an unbranched tree representing a partial structure of the document, the pruning being based on whether a text in the unstructured document corresponding to the path to the leaf node is accommodated in a single group of words.

2. The method of claim 1, wherein the grouping is performed based on a combination of an extraction rule matched to the candidate element and a classification by an adjacent element adjoined to the candidate element.

3. The method of claim 1, wherein the pruning comprises:
   identifying an unbranched tree from among the one or ore trees as a valid unbranched tree; and
   removing an inconsistent node overlapping a node already found in the valid unbranched tree from a remaining branched tree among the one or more trees.

4. The method of claim 3, wherein the pruning further comprises:
   pruning out an inconsistent branch extending over a valid node already found in the valid unbranched tree based on positions of a branch and the valid node.

5. The method of claim 3, wherein the unbranched tree includes an unbranched tree accommodated in the single group of the words and/or an unbranched tree spreading over multiple groups of words.

6. The method of claim 3, wherein the pruning further comprises:
   identifying a chain to be regarded as a valid tree based on a heuristics rule if there exist a remaining tree not identified as the valid tree; and
   repeating the identifying of the unbranched tree and the removing of the inconsistent node iteratively.

7. The method of claim 1, wherein the pruning comprises:
   assigning a higher priority to a tree having the candidate element accompanying a prefix and/or a preceding linefeed code than other trees without the prefix or the preceding linefeed code among the one or more trees.

8. The method of claim 3, further comprising determining a hierarchy between the valid unbranched trees based on positions of the valid unbranched trees.

9. The method of claim 1, further comprising removing an invalidly extracted element not describing the document structure from the one or more candidate elements.

10. The method of claim 1, wherein the document is a text document, the single group of the words is a single sentence and the candidate element includes an ordered or unordered object.

11. The method of claim 1, wherein each tree accommodates one or more combinations of elements successively picked up from the group in a reading direction, each combination representing each potential partial structure in the document structure.

12. The method of claim 1, wherein at least one of the extracting, the grouping, the building and the pruning is performed in a cloud computing environment.

13. A method for estimating document structure of a document, comprising:
    extracting one or more candidate elements describing a logical document structure from an unstructured document based on an extraction rule characterizing an element to be extracted;
    grouping the one or more candidate elements into a group based on a combination of the extraction rule matched to the candidate element and a classification by an adjacent element adjoined to the candidate element;
    building one or more trees, representing the logical document structure of the unstructured document, for the group, each tree having a root node and a leaf node selected from the candidate elements in the group; and
    pruning the one or more trees based on a path from the root node to the leaf node for each tree to identify an unbranched tree representing a partial structure of the document.

14. A computer system for estimating document structure of an unstructured document by executing program instructions, the computer system comprising:
    a memory configured to tangibly store the program instructions;
    a processor in communication with the memory, wherein the computer system is configured to:
        extract one or more candidate elements describing a logical document structure from an unstructured document;
        group the one or more candidate elements into a group;
        build one or more trees, representing the logical document structure of the unstructured document, for the group, each tree having a root node and a leaf node selected from the candidate elements in the group;
        prune the one or more trees while leaving a path from the root node to the leaf node to identify an unbranched tree representing a partial structure of the document, the one or more trees being pruned based on whether a text in the unstructured document corresponding to the path to the leaf node is accommodated in a single group of words.

15. The computer system of claim 14, wherein the grouping is performed based on a combination of an extraction rule matched to the candidate element and a classification by an adjacent element adjoined to the candidate element.

16. The computer system of claim 14, wherein the computer system is further configured to:
    identify an unbranched tree from among the one or more trees as a valid unbranched tree; and
    remove an inconsistent node overlapping a node already found in the valid unbranched tree from a remaining branched tree among the one or more trees.

17. The computer system of claim 16, wherein the computer system is further configured to:
    prune out an inconsistent branch extending over a valid node already found in the valid unbranched tree based on positions of a branch and the valid node.

18. The computer system of claim 16, wherein the unbranched tree includes an unbranched tree accommodated in the single group of the words and/or an unbranched tree spreading over multiple groups of words.

19. A computer program product for estimating document structure of an unstructured document, the computer program product comprising a non-transitory computer readable storage medium having program instructions embodied therewith, the program instructions executable by a computer to cause the computer to perform a method comprising:
    extracting one or more candidate elements describing a logical document structure from an unstructured document;
    grouping the one or more candidate elements into a group;
    building one or more trees, representing the logical document structure of the unstructured document, for the group, each tree having a root node and a leaf node selected from the candidate elements in the group; and
    pruning the one or more trees while leaving a path from the root node to the leaf node to identify an unbranched tree representing a partial structure of the document, the pruning being based on whether a text in the unstructured document corresponding to the path to the leaf node is accommodated in a single group of words.

20. The computer program product of claim 19, wherein the grouping is performed based on a combination of an extraction rule matched to the candidate element and a classification by an adjacent element adjoined to the candidate element.

21. The computer program product of claim 19, wherein the pruning comprises:
    identifying an unbranched tree from among the one or more trees as a valid unbranched tree; and
    removing an inconsistent node overlapping a node already found in the valid unbranched tree from a remaining branched tree among the one or more trees.

22. The computer program product of claim 21, wherein the pruning further comprises:
    pruning out an inconsistent branch extending over a valid node already found in the valid unbranched tree based on positions of a branch and the valid node.

23. The computer program product of claim 21, wherein the unbranched tree includes an unbranched tree accommodated in the single group of the words and/or an unbranched tree spreading over multiple groups of words.

* * * * *